United States Patent
Celebi et al.

(10) Patent No.: US 8,548,515 B2
(45) Date of Patent: Oct. 1, 2013

(54) OPEN LOOP POWER OFFSET UPDATE

(75) Inventors: Samel Celebi, Basking Ridge, NJ (US);
Charles Stanski, Belvidere, NJ (US);
Sundeep Rangan, Jersey City, NJ (US)

(73) Assignee: QUALCOMM Incorporated, San Diego, CA (US)

(*) Notice: Subject to any disclaimer, the term of this patent is extended or adjusted under 35 U.S.C. 154(b) by 154 days.

(21) Appl. No.: 13/088,210

(22) Filed: Apr. 15, 2011

(65) Prior Publication Data

US 2011/0256902 A1    Oct. 20, 2011

Related U.S. Application Data

(63) Continuation of application No. 11/773,939, filed on Jul. 5, 2007, now Pat. No. 7,957,757.

(51) Int. Cl.
*H04Q 7/20*    (2006.01)

(52) U.S. Cl.
USPC ............. 455/522; 455/69; 455/500; 455/517; 455/67.11; 455/509; 370/310; 370/328; 370/329; 370/338; 370/343

(58) Field of Classification Search
USPC ............... 455/522, 69, 68, 500, 517, 67.11, 455/503, 445, 509, 513, 515, 514, 412.1, 455/412.2, 426.1, 426.2, 422.1, 403; 370/310, 370/328, 329, 338, 343
See application file for complete search history.

(56) References Cited

U.S. PATENT DOCUMENTS

| | | | |
|---|---|---|---|
| 5,564,075 A | 10/1996 | Gourgue | |
| 6,512,931 B1 * | 1/2003 | Park et al. | 455/522 |
| 6,747,960 B2 | 6/2004 | Tillotson | |
| 7,587,219 B2 | 9/2009 | Bottomley et al. | |
| 7,957,757 B2 | 6/2011 | Celebi et al. | |
| 2003/0039218 A1 | 2/2003 | Kwak | |
| 2004/0147274 A1 | 7/2004 | Khawand et al. | |
| 2006/0046789 A1 * | 3/2006 | Huh et al. | 455/571 |
| 2007/0191044 A1 | 8/2007 | Kostic et al. | |
| 2008/0009306 A1 | 1/2008 | Suga et al. | |
| 2008/0032730 A1 * | 2/2008 | Landau et al. | 455/522 |
| 2009/0247211 A1 | 10/2009 | Kuroda | |

FOREIGN PATENT DOCUMENTS

| | | |
|---|---|---|
| RU | 2120183 C1 | 10/1998 |
| RU | 2253947 C2 | 6/2005 |
| WO | WO2004054310 | 6/2004 |
| WO | WO2006015983 A1 | 2/2006 |
| WO | WO2006085365 A1 | 8/2006 |
| WO | WO2007052753 A1 | 5/2007 |

OTHER PUBLICATIONS

European Search Report—EP08153620—Search Authority—Munich—Sep. 30, 2008.
European Search Report—EP11176020—Search Authority—Munich—Apr. 25, 2012.
International Search Report and Written Opinion—PCT/US2008/068720, International Search Authority—European Patent Office—Oct. 14, 2008.
Miller L E., et al., "CDMA Systems Engineering Handbook," Artech House Publishers, pp. 369-370, 1998.

* cited by examiner

*Primary Examiner* — Keith Ferguson
(74) *Attorney, Agent, or Firm* — John J. Ketchum

(57) ABSTRACT

Provided is an feedback mechanism to correct power control information in a broadcast signal that is determined to be incorrect by one or more devices that receive and rely on the broadcast information. A device that receives the incorrect broadcast information can determine a correction and to the information and provide a recommendation to tilt source of the broadcast information. The source can selectively determine whether to modify the broadcast information based on the recommendation from one or more devices. If the broadcast information is modified, subsequent devices that receive the broadcast information are provided with the modified information. If further changes are needed, the subsequent devices can provide further recommended changes.

20 Claims, 11 Drawing Sheets

OPEN LOOP POWER OFFSET UPDATE

The present Application for Patent is a continuation of patent application Ser. No. 11/773,939 entitled "OPEN LOOP POWER OFFSET UPDATE" filed Jul. 5, 2007, now allowed and assigned to the assignee hereof and hereby expressly incorporated by reference herein.

BACKGROUND

I. Field

The following description relates generally to wireless communications, and more particularly to open loop power control in a wireless communication environment.

II. Background

Wireless communication systems are widely deployed to provide various types of communication and have become a prevalent means by which a large number of people worldwide communicate. A typical wireless communication system or network can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others. Wireless communication devices have become smaller and more powerful to meet consumer needs, which include improved portability and convenience. Users have found many uses for wireless communication devices, such as cellular telephones, personal digital assistants (PDAs), and the like, and such users demand reliable service and expanded coverage areas.

Wireless communications networks are commonly utilized to communicate information regardless of where a user is located (inside or outside a structure) and whether a user is stationary or moving (e.g. in a vehicle, walking). Generally, wireless communications networks are established through a mobile device communicating with a base station or access point. The access point covers a geographic region or cell and, as the mobile device is operated, the mobile device may move in and out of these geographic cells. To achieve uninterrupted communication, the mobile device is assigned resources of a cell it has entered and de-assigned resources of a cell it has exited.

To effectuate continued coverage, access points associated with networks are geographically positioned so as users change location they do not lose services. Thus, mobile devices can be "handed off" from a first base station to a second base station. In other words, a mobile station will be serviced by a first base station while in a geographic region associated with such base station. When the mobile device is transported to a region associated with a second base station, the mobile device will be handed off from the first base station to the second base station. Ideally, the handoff occurs without data loss, loss of service, and the like. However, if it takes a mobile device an excessive amount of time to establish communication with a base station, the call might be lost or communications interrupted. In addition, inadequate communication with a base station might cause interference to neighboring devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope deny or all aspects. Its sole purpose is to present some concepts of one or more aspects in a simplified form as a prelude to the more detailed description that is presented later.

In accordance with one or more examples and corresponding disclosure thereof, various aspects are described in connection with facilitating automatic correction of broadcast information through a feedback mechanism so that subsequent broadcast communications include information that is more accurate. Information included in a broadcast signal can relate to information necessary for a device to communicate with base stations or other devices in a vicinity of the device. As such, broadcast information can include an access point transmit power, an access point receive power target, power loss, and other information. If the broadcast information is determined to be incorrect, the access point (or other device that broadcast the information) can receive a recommended modification and selectively apply such modification to information contained in a subsequent broadcast signal.

Another aspect relates to a method that facilitates selective adjustment of power control information sent in a broadcast signal. The method can include receiving, from an access point, a broadcast signal that includes power control information and ascertaining if a correction is recommended for the broadcast power control information. The recommended correction can be conveyed to the access point.

Another aspect relates to a wireless communications apparatus that includes a memory and a processor. The memory can retain instructions related to evaluating power control information included in a broadcast signal, determining if there is at least one error in the information and notifying an access point of the at least one error in a feedback signal. The processor can be coupled to the memory and configured to execute the instructions retained in the memory.

Yet another aspect relates to a wireless communications apparatus that enables selective modification of broadcast information within a wireless communications environment. The apparatus can include a means for identifying incorrect information included in a signal from an access point and a means for determining a recommended modification for the identified incorrect information. Also included in apparatus can be a means for sending the recommended modification in a feedback signal to the access point.

Still another aspect relates to a machine-readable medium having stored thereon machine-executable instructions for evaluating a correctness of a signal from an access point; and determining at least one recommended change to the signal. The instructions can also include sending the at least one recommended change to the access point in a feedback signal.

A further aspect relates to an apparatus that includes a processor, the apparatus is in a wireless communication system. The processor can be configured to identify inaccurate information included in a signal from an access point. Additionally processor can be configured to determine a change that will correct the inaccurate information and provide to the access point a feedback signal that includes the determined change. The determined change can be based at least in part on information included in the signal.

Still another aspect relates to a method that facilitates selective adjustment of information included in a broadcast signal. The method can include broadcasting a signal that includes power control information. The signal can be broadcast to at least one device within a geographic area. The method can further include receiving from the at least one device a reply signal that includes at least one modification to the power control information included in the broadcast signal and selectively applying the at least one modification to the power control information included in the broadcast signal.

Yet another aspect relates to a wireless communications apparatus that includes a memory and a processor. The memory can retain instructions related to determining information to include in a broadcast signal, receiving a device recommendation to update information included in the broadcast signal, and selectively modifying the broadcast signal information based in part on the received device recommendation. The processor can be coupled to the memory and configured to execute the instructions retained in the memory.

Another aspect to a wireless communications apparatus that mitigates a length of an initial access phase in a wireless environment. The apparatus can include a means for identifying information to include in a broadcast signal sent to a plurality of devices and a means for receiving at least one reply signal from at least one of the plurality of devices in response to the broadcast signal. Also included in the apparatus can be a means for changing at least a subset of the information included in the broadcast signal based in part on the at least one reply signal.

Still another aspect can relate to a machine-readable medium having stored thereon machine-executable instructions for transmitting a signal that at least one device relies upon to gain access to a communications network and evaluating feedback from the at least one device to identify incorrect information included in the transmitted signal. The instructions also relate to adapting the transmitted signal based upon the feedback evaluation.

Yet another aspect relates to an apparatus in a wireless communication system. The apparatus can include a processor that can be configured to identify information to include in a broadcast signal that is sent to a plurality of devices. The process can further be configured to evaluate one or more modifications to the information in the broadcast signal, the one or more modifications are received from a subset of the plurality of devices and modify the information included in a subsequent broadcast signal based on the one or more modifications received.

To the accomplishment of the foregoing and related ends, the one or more examples comprise the features hereinafter fully described and particularly pointed out in the claims. The following description and the annexed drawings set forth in detail certain illustrative aspects of the one or more examples. These aspects are indicative, however, of but a few of the various ways in which the principles of various examples may be employed and the described examples are intended to include all such aspects and their equivalents.

To the accomplishment of the foregoing and related ends, the one or more examples comprise the features hereinafter fully described and particularly pointed out in the claims. The following description and the annexed drawings set forth in detail certain illustrative aspects of the one or more examples. These aspects are indicative, however, of but a few of the various ways in which the principles of various examples may be employed and the described examples are intended to include all such aspects and their equivalents.

DETAILED DESCRIPTION

Figure 1:
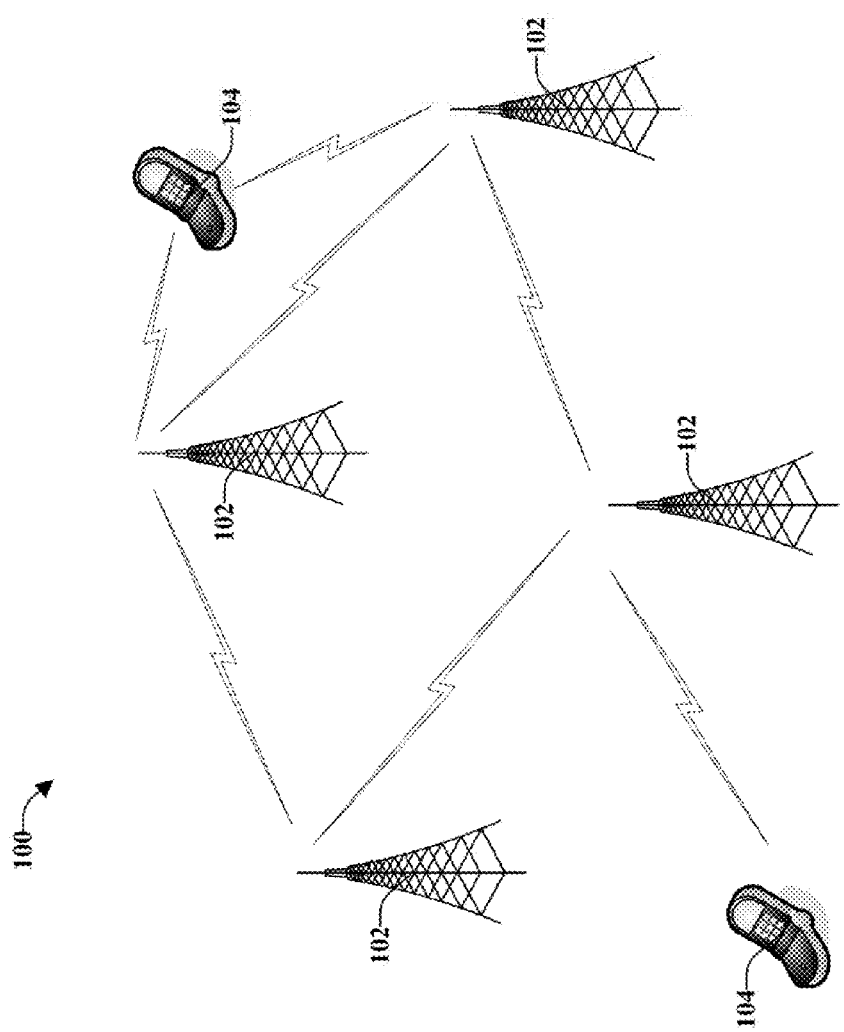
FIG. 1 illustrates a wireless communication system, in accordance with various aspects set forth herein.

Various examples are now described with reference to the drawings, wherein like reference numerals are used to refer to like elements throughout. In the following description, for purposes of explanation, numerous specific details are set forth in order to provide a thorough understanding of one or more examples. It may be evident, however, that such examples may be practiced without these specific details. In other instances, well-known structures and devices are shown in block diagram form in order to facilitate describing one or more examples.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor; an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore; various aspects are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular phone, a cordless telephone, a Session Initiation Protocol (SIP) phone, a wireless local loop (WLL) station, a personal digital assistant (PDA), a laptop, a handheld communication device, a handheld computing device, a computing device, a satellite radio, a global positioning system, a processing device connected to a wireless modem and/or other suitable devices for communication. Moreover, various aspects are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, an so forth), optical disks (e.g., compact disk (CD), digital versatile disk (DVD), and the like), smart cards, and flash memory devices (e.g., EPROM, card, stick, key drive, and so on). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, illustrated is a wireless communication system or multi-user wireless environment 100 in accordance with the various aspects disclosed herein. System 100 can comprise one or more base stations 102 (e.g., access points) in on or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, and so one) as will be appreciated by one skilled in the art. Base stations 102 can transmit information to mobile devices 104 over forward links (downlinks) and receive information from mobile devices 104 over reverse links (uplinks). Base station 102 can transmit broadcast signals that include information that allow mobile devices 104 to identify and communicate with base station 102. The broadcast signal can include various information including access point pilot tones and/or power level information.

In a multi-user wireless network, as illustrated by system 100, mobile devices 104 should limit their transmit powers to a nominal level in order to mitigate an amount of interference caused to other mobile devices 104. Transmitting using very little power, however, places the mobile device 104 at a risk of not being heard by the base station 102. Thus, excessive transmit power can lead to undesired interference to other mobile devices that share the medium, while too little power can cause a communication failure. An approach that can be utilized to provide mitigation of interference is through a closed-loop power control where base station 102 monitors a received power from individual mobile devices 104 and informs mobile devices 104 to adjust their transmit powers to a desired level. For the closed-loop power control to operate properly, mobile device 104 should be transmitting a signal. Thus, this approach might not be utilized during the initial access phase where mobile device 104 has not yet started transmitting.

A procedure for controlling a mobile device power in the initial access phase can be through an open loop power control where mobile device 104' estimates its target transmit power based on a power of a received signal. This can assume substantially the same forward link and reverse link losses and that the difference between the mobile device transmit power and receive power is a constant offset. This offset can be referred to as the Open Loop Power Offset (OLPO). An estimate of the OLPO can be computed by mobile device 104 or it can be computed by base-station 102 and communicated to mobile device 104. Mobile device 104 can add the OLPO estimate value to the measured received power to obtain an initial transmit power (e.g., final offset value).

Due to several unknowns and variations in the system 100, the estimate may be inaccurate. This can cause the mobile device transmit power to either overshoot (e.g. causing excessive interference) or fall short of the desired level (e.g., failed access connection and so forth). In either situation, mobile device 104 would blindly increase and/or decrease its power gradually until an acknowledgement of a successful mobile device 104 transmission is received from base station 102. This extra step of power search can prolong an initial access phase, resulting in a lost communication signal or other problems.

In accordance with the disclosed aspects, the extra step can be mitigated for subsequent mobile devices 104 that initiate communication with base station 102. For example, upon successful access, a mobile device 104 can report its measured final offset value to base station 102. Base station 102 can update its estimate of the OLPO based on reports from one or more mobile devices 104 and base station 102 can use this new value for future attempts (e.g., subsequent broadcast signals), which can mitigate excessive access times for subsequent access attempts by other mobile devices 104. Thus, the various aspects can provide quicker and potentially more accurate open loop power control between base station 102 and mobile devices 104 by updating the power offset values, if needed. These changes can be made when a mobile device 104 successfully achieves access to the base station 102 or when base station 102 achieves an adequate confidence level relating to the accuracy of the recommendation to change the broadcast information (e.g., confirmation from more than one device, average of all changes received in a given interval or other criteria and so forth).

Figure 2:
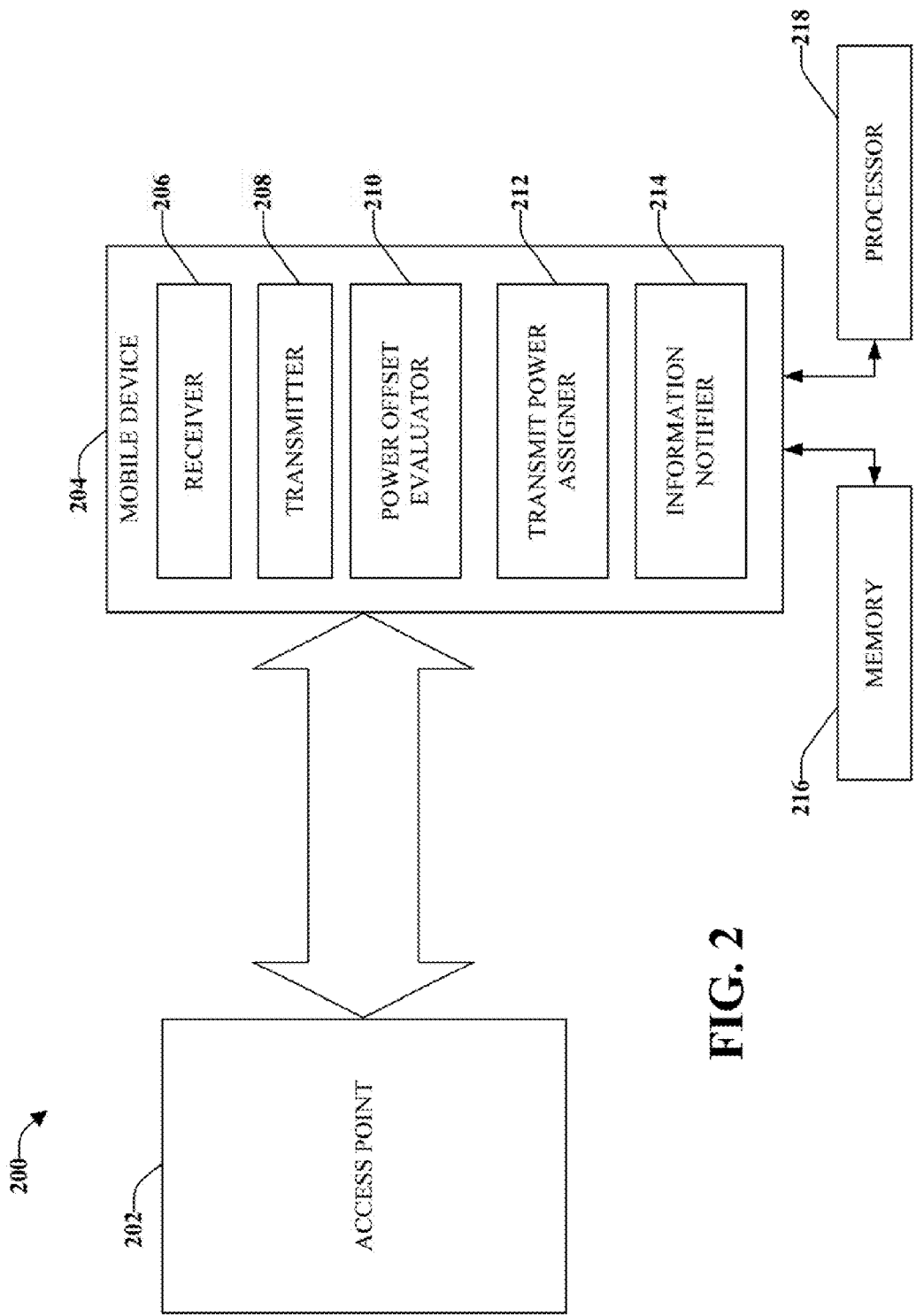
FIG. 2 illustrates an example system that selectively updates broadcast information in a wireless communication environment.

FIG. 2 is an illustration of an example system 200 that enables correction of broadcast information for subsequent transmissions in a wireless communication environment. Included in system 200 are an access point 202 and a mobile device 204. It should be understood that system 200 can include more access points and mobile devices and one of each is illustrated and described for simplicity purposes. Access point 202 can broadcast information that allows mobile device 204 to identify and establish communication with access point 202. Included in a broadcast signal should be at least an access point transmit power and an access point receive power target.

An example of incorrect information that can be corrected with the disclosed features is offset information, although other information and calculations can also be corrected. As it relates to offset information, at substantially the same time as mobile device 204 is in communication with access point 202, mobile device 204 can measure a power offset and determine what power offset information should have been included in the information broadcast by access point 202 to allow mobile devices to more readily establish communication with access point 202. Mobile device 204 can communicate this corrected information to access point 202 utilizing a feedback or reply signal.

If further detail, mobile device 204 can include a receiver 206 that can be configured to receive information included the broadcast signal from base station 202 (as well as other communication signals from base station 202 and other devices). Once a connection is established between mobile device 204 and access point 202, access point 202 can monitor an incoming mobile device power and send corrections to mobile device 204. Such corrections can instruct mobile device 204 to adjust its power so that signals arrive at access point 202 at a desired Signal to Noise Ratio (SNR). The SNR is a measurement of the relative level of noise within a network and can correspond to a transmission quality. SNR is the ratio of the usable signal being transmitted to the noise or undesired signal.

An access request is generally the first signal that mobile device 204 transmits to access point 202, through a transmitter 208, for example. Thus, prior to receiving this signal, access point 202 is not aware of the power level at which signals from mobile device 204, will arrive. However, based on an access point transmit power ($AP_{TxPwr}$) information included in the broadcast signal, a power offset evaluator 210 associated with mobile device 204, can ascertain a rough adjustment of the transmit power at which is should transmit ($AT_{TxPwr}$), utilizing a closed-loop power control. The mobile device transmit power ($AT_{TxPwr}$) can be based on a power ($AT_{RxPwr}$) at which mobile device 204 receives the signal plus any path losses (L). Thus, $$AT_{RxPwr} = AP_{TxPwr} - L \qquad \text{Equation 1.}$$

and solving for the path losses (L):

$$L = AP_{TxPwr} - AT_{RxPwr} \qquad \text{Equation 2.}$$

Based on the determined path losses (L), transmit power assignor 212, can set the mobile device transmit power ($AT_{TxPwr}$) to the determined path losses (L) plus the access point receive power target ($AP_{RxPwr}$):

$$AT_{TxPwr} = AP_{RxPwr} + L \qquad \text{Equation 3}$$

thus, $$AT_{TxPwr} = AP_{RxPwr} + (AP_{TxPwr} - AT_{RxPwr}) \qquad \text{Equation 4.}$$

The process described above is commonly referred to as open loop power control and has several deficiencies that can be overcome with the aspects disclosed herein. For example, there can be some calibration error and/or errors in measuring the received pilot power and/or the device transmit power. The result of such errors might result in the initial access from mobile device 204 coming in at too high a power or at too low a power. If the power is too high, it can cause interference to the other mobile devices 204 within system 200. If the power is too low, access point 202 might not hear the communication from mobile device 204, which can result in a delay before mobile device 204 can communicate with access point 202. The transmit power of mobile device 204 can be altered until mobile device 204 eventually can communicate with access point 202, resulting in delay while the power is altered. This sight delay can cause problems especially during handoff when it is important to establish a connection quickly. The disclosed aspects can mitigate the delay for subsequent mobile devices to achieve communication with access point 202.

The access point receive power target ($AP_{RxPwr}$) or offset value information can be communicated to access point by information notifier 214. The communication can include a recommendation to adjust information in the broadcast signal so that the signal includes correct information relating to the offset value so that devices that receive the broadcast signal are aware and can quickly calculate the value at which mobile devices should transmit. It should be understood that other corrections to the broadcast signal information can be applied utilized the disclosed features.

Access point 202 can modify the broadcast information based on the recommendation (e.g., rely on the received recommendation). Access point 202 can solicit and receive confirmation from one or more mobile devices before changing the information. Alternatively or additionally, access point 202 can wait until a predetermined number of similar recommendations are received and adjust the broadcast information based on an average or other compilation of all the received recommendations. Access point 202 may establish other criteria (e.g., confidence level) in order to establish verification before changing information included in a broadcast signal.

A memory 216 can be operatively coupled to mobile device 204. Memory 216 can store information related to mobile device identification information, mobile device transmit power, path losses, access point receive power target, access point transmit power, OLPO and other suitable information related to verifying information included in a signal received from access point 202. Memory 216 can retain instructions related to evaluating information included in a broadcast signal, determining if there is at least one error in the information and notifying access point 202 of the at least one error in a feedback signal. A recommendation can be sent to access point 202 to correct the error in a next broadcast signal. The error can relate to a power offset-value and/or other information included in the broadcast signal. Additionally and/or alternatively memory 216 can retain instructions for notifying access point 202 if the information contained in the broadcast signal is correct. Additionally, memory 216 can retain instructions for determining a power offset value by comparing an access point transmit power with a device receive power and setting a transmit power of mobile device 204 to a sum of the offset value and an access point receive power target. In accordance with some aspects, memory 216 can retain instructions for reviewing a next broadcast signal and providing information relating to an accuracy of the next broadcast signal.

Memory 216 can store protocols associated with generating acknowledgments, recommending-changes to broadcast information; taking action to control communication between mobile device 204 and access point 202, etc., such that system 200 can employ stored protocols and/or algorithms to achieve improved communications in a wireless network as described herein. It should be appreciated that the data store (e.g., memories) components described herein can be either volatile memory or nonvolatile memory; or can include both volatile and nonvolatile, memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 216 of the disclosed aspects are intend to comprise, without being limited to, these and other suitable types of memory.

A processor 218 can be operatively connected to mobile device 204 (and/or memory 216) and can be configured to execute the instructions retained in the memory. Process 218 can also be configured to facilitate analysis of information related to correcting information in system 200. Processor 218 can be a processor dedicated to analyzing and/or generating information received by receiver 206, a processor that controls one or more components of system 200, and/or a processor that both analyzes and generates information and controls one or more components of system 200.

Figure 3:
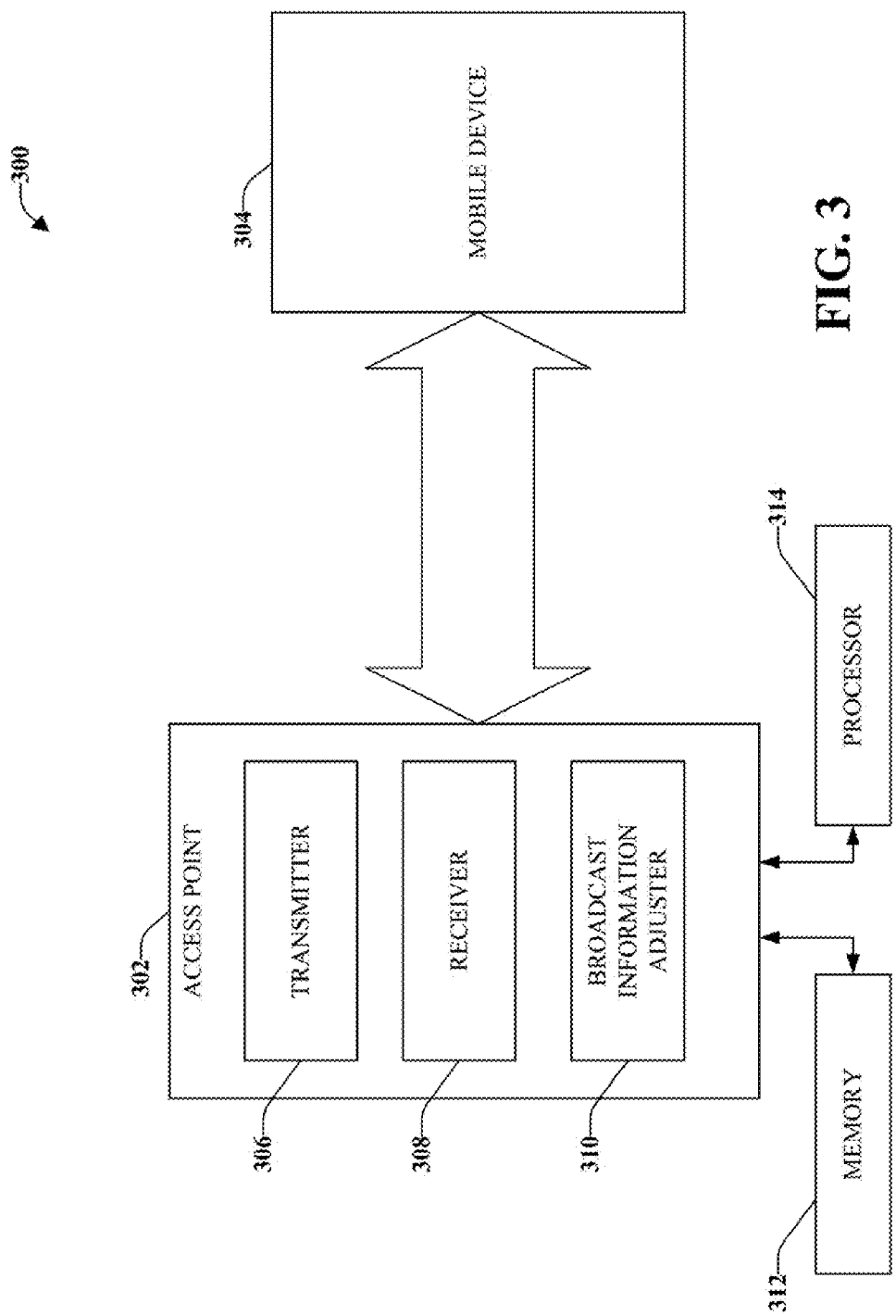
FIG. 3 illustrates an example system that enables correction of broadcast information for subsequent transmissions in a wireless communication environment.

Now referring to FIG. 3, illustrated is an example system 300 that selectively updates broadcast information in a wireless communication environment. System 300 includes at least one access point 302 and at least one mobile device 304. Access point 302 includes a transmitter 306 that can continuously or periodically broadcast forward link information that allows mobile devices 304 within a geographic range of access point 302 to identify access point 302 (or network) and selectively gain access to access point 302. Such selective access can be based on various criteria including strength of the signal or quality of the signal, as well as other factors. According to an example, the broadcast information can include an access point transmit power, an access point receive power target, an amount of power loss, power offset information, a corrected delta value, or combinations thereof and/or other information.

Mobile device 304 can measure a pilot power from information included in the broadcast signal. The pilot power is the transmit power of the access point minus any path losses. Path losses are defined as the power loss that occurs when radio waves move through space during specific paths. Mobile device 304 can solve for the path loss power (L) by subtracting a received pilot power ($Pow_{RxPil}$) from the access point transmit power:

$$L_{DL} = Pow_{TxPil} - Pow_{RxPil} \quad \text{Equation 5.}$$

where $Pow_{TxPil}$ is the total pilot power of access point 302. $L_{DL}$ symbolizes the downlink path loss. It should be noted that Equation 4 is substantially the same as Equation 1. For the uplink access request to arrive at the desired SNR level, the access point receive power $Pow_{RxAcs}$ should be:

$$Pow_{RxAcs} = snrTgtAcs + PowNoise \quad \text{Equation 6.}$$

or similarly on the mobile side:

$$Pow_{TxAcs} = Pow_{RxAcs} + L_{UL} \quad \text{Equation 7.}$$

assuming that $L_{DL}$ is equal to $L_{UL}$, then:

$$Pow_{TxAcs} + Pow_{RxPil} = Pow_{RxAcs} + Pow_{TxPil} \quad \text{Equation 8.}$$

Both terms, $Pow_{TxPil}$ and $Pow_{RxAcs}$ can be known by access point 302. Thus, access point 302 can communicate the right hand side of Equation 8, $Z = Pow_{RxAcs} + Pow_{TxPil}$ to mobile device 304 through a broadcast channel. The parameter Z is referred to as the open-loop gain offset. Mobile device 304 can add the Z offset to its received pilot power to obtain an estimated figure for its initial transmit power.

$$Pow_{TxAcs} = Z - Pow_{RxPil} \quad \text{Equation 9.}$$

If mobile device 304 is unsuccessful in gaining-access, it may reattempt accessing at different power levels, either higher or lower than the initial access power from Equation 9. Eventually, if mobile device 304 gain access, mobile device 304 can report to access point 302 the final open loop power gain offset $Z_{final}$ at which mobile device 304 was able to connect to access point 302. Access point 302 can use $Z_{final}$ fine tune its copy of the gain offset and include such value in its broadcast signal.

To facilitate selective updates to broadcast information, at substantially the same time as mobile device 304 receives the broadcast information, it may notify access point 302 of any incorrect data and/or offer a recommendation as to what will correct the information. Mobile devices 304 can be configured to perform such notification automatically or access point 302 may specifically request such information.

A broadcast information adjuster 310 can be configured to selectively modify or adapt information in the broadcast signal for future broadcasts. For example, broadcast information adjuster 310 can modify the broadcast information at substantially the same time as a correction notification or recommendation is received from mobile device 304. Additionally or alternatively, broadcast information adjuster 310 might solicit verification from other mobile devices to determine whether the corrected information received from mobile device 304 is accurate. Depending on the recommended changes, broadcast information adjuster 310 might not modify the information including in the broadcast signal. Alternatively or additionally, if different information is received from mobile devices 304, broadcast information adjuster 310 can average the changes received, can take a median of recent reports or apply any other meaningful statistical measure and send the change to the broadcast information. Other modifications, adjustments, or acceptance of the received recommended changes can be implemented by broadcast information adjuster 310.

A subsequent mobile device receiving the broadcast signal (e.g., new device entering a geographic range of an access point) can benefit from more accurate information (e.g., modified information) within the broadcast signal. As such, these subsequent mobile devices can more efficiently establish and maintain communications with access point 302. If there are additional modifications that should be made (e.g., the information is still incorrect or other information is determined to be incorrect), the subsequent mobile device can recommend such modifications in a similar manner as described above. If the information is acceptable (e.g., correct), subsequent mobile devices do not have to send information informing access point 302 that the information is correct. However, this information can be communicated to access point 302 in accordance with some aspects.

A memory 312 can be operatively coupled to access point 302. Memory 312 can store information and/or retain instructions relating to determining information to include in a broadcast signal. Such information in the broadcast signal can relate to at least one of an access point transmit power, an access point receive power target, a path loss, or a power offset, or combinations thereof. Memory 312 can further store information and/or retain instructions relating to receiving a device recommendation to update information included in the broadcast signal and selectively modifying the broadcast signal information based in part oh the received device recommendation. Additionally, memory 312 can store information and/or retain instructions for determining a confidence level associated with the device that provided the recommendation, for requesting corroboration of the provided recommendation from at least a second device, for requesting confirmation of the information included in the broadcast signal, for averaging values received from a plurality of devices before selectively modifying the information in the broadcast signal, for receiving feedback from the device that provided the recommendation after modifying the broadcast signal to verify appropriate modifications were made and/or other suitable information related to updating and verifying the accuracy of information included in a broadcast signal.

A processor 314 can be operatively connected to access point 302 (and/or memory 312) to facilitate analysis of information related to updating and verifying broadcast information and/or can be configured to execute the instructions retained in memory 312. Processor 314 can be a processor dedicated to analyzing information received by receiver 308 and/or generating information that can be utilized by transmitter 306 and/or broadcast information adjuster 310, a processor that controls one or more components of system 300, and/or a processor that analyzes information, generates information and controls one or more components of system 300.

Figure 4:
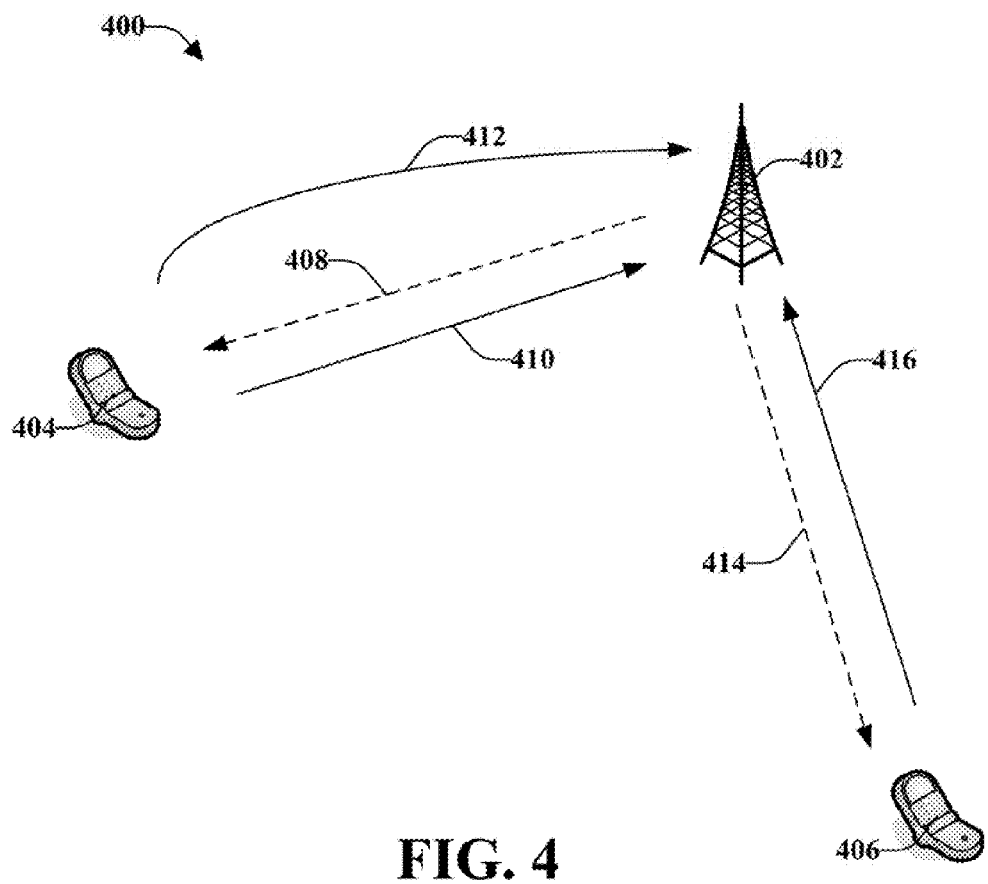
FIG. 4 illustrates an example communications network that facilitates automatic correction of broadcast information through a feedback mechanism.

With reference to FIG. 4 is an illustration of an example communications network 400 that facilitates automatic correction of broadcast information through a feedback mechanism. System 400 can be configured to modify information determined to be incorrect and apply such modified information selectively to subsequent communications. The information can be broadcast to a multitude of devices within the vicinity wherein such devices partially or completely rely on such broadcast information (e.g., power offset information).

In further detail, system includes an access point 402 and mobile devices 404 and 406. Mobile device 404 can be a first device that enters a geographic range of access point 402 and second mobile device 406 can enter the geographic range of access point 402 after first mobile device 404. Access point 402 can periodically or continuously transmit or broadcast forward link information, illustrated at 408 (and 414). Such information allows devices 404, 406 within the vicinity to utilize access point 402 selectively. Such selective utilization can be based on various criteria including strength of the signal or quality of the signal, as well as other factors. The broadcast information can include an access point transmit power, an access point receive power target and/or other information.

First mobile device 404 can measure a received pilot power, which is the access point's transmit power minus any path losses. Mobile device 404 can solve for the path loss power (L) by subtracting the received pilot power from the broadcast access point transmit power. Mobile device 404 can set its transmit power to the access point receive power plus the determined path loss. Mobile device 404 can send communications 410 to access point 402 utilizing the determined transmit power level.

The process described above is commonly referred to as open loop power control and has several deficiencies that can be overcome with the disclosed features. A deficiency is that there can be some calibration error and/or errors in measuring the received pilot power and/or the device transmit power. The result of such errors might result in the initial access coming in at too high of a power or too low of a power. If the power is too high, it can cause interference. If the power is too low, the access point might not hear the communication from mobile device. An error in calibration and/or measurement will result in a delay before mobile device can communicate, with the access point. This delay is a function of mobile device, altering its, transmit power until it eventually can communicate with the access point. This slight delay can cause problems especially during handoff when it is important to establish the connection quickly.

The disclosed aspects overcome this delay so that subsequent mobile devices 406 that come within the range of access point 402 can obtain quick communication with access point 402. Mobile device 404 receives the broadcast information in a forward link 408 from base station 402 and calculates its device transmit power similar to the process described above. After mobile device 404 is in communication with access point 402, it measures the power offset and determines what power offset information should have been broadcast by access point 402. Mobile device 404 communicates this offset information to access point 402 in a feedback loop illustrated at 412.

Access point 402 can selectively modify its broadcast information based on the information received from mobile device 404. If the information received from mobile device 404 is utilized to update the broadcast signal, the updated signal can be broadcast 414 (and 408) and heard by a subsequent mobile device 406 that enters the geographic range of access point 402. As such, mobile device 406 can benefit from the updated (and potentially correct) information in the broadcast signal to mitigate the amount of time to establish a communication, illustrated at 416, with access point 402. Mobile device 406 can provide a recommendation to access point 402 if the broadcast information (or a sub-portion of the broadcast information) is incorrect in a manner similar to that described above. If the broadcast information is correct, mobile device 406 may provide such information to access point 402, however such notification is not necessary.

Figure 5:
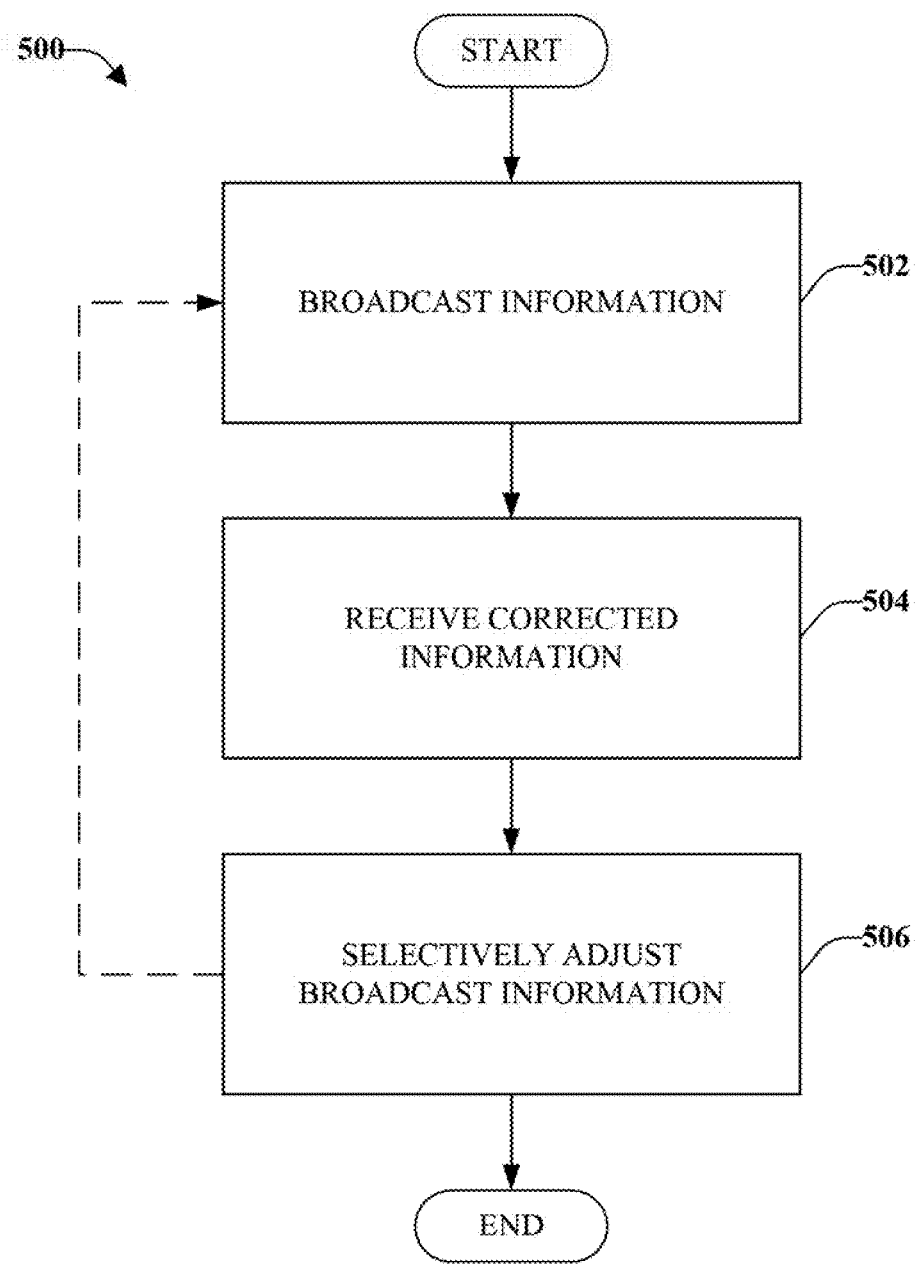
FIG. 5, illustrates example methodology that facilitates broadcasting corrected information within a wireless communication environment.
Figure 6:
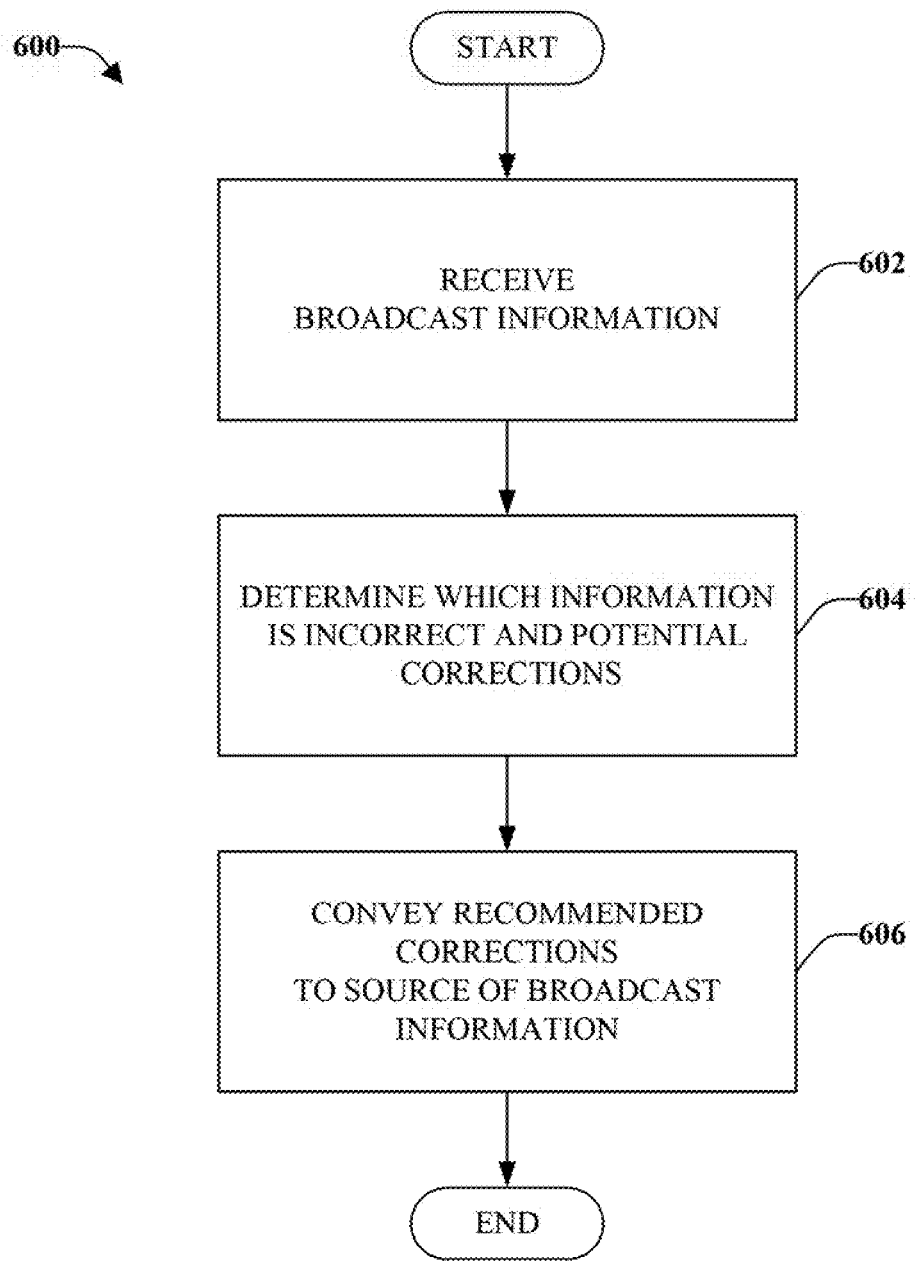
FIG. 6 illustrates an example methodology that facilitates selectively adjusting and reporting information modifications within a wireless communication environment.

Referring to FIGS. 5-6, methodologies relating to updating broadcast information so that subsequent communication of such broadcast information provides more accurate information that can be relied upon are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 5 is an illustration of an example methodology 500 that facilitates selectively adjusting information included in a broadcast signal within a wireless; communication environment. Method 500 starts, at 502, when information including power control information is broadcast (e.g. periodically, continuously). Such information can be broadcast to one or a multitude of devices within a geographic range or vicinity wherein such devices partially or completely rely on such broadcast information. The broadcast signal can include information relating to an access point receive power target, an access point transmit power, a power offset, a path loss, or combinations thereof and/or other information. In some situations, access point power target (or other information included in the signal) is not correct and mobile devices that come within the vicinity of an access point that rely on this information to communicate with the access point can not obtain instantaneous communication with access point. For example, if the power target is too low, the access point might not hear the communication from the mobile device. If the power target is too high, interference can be caused to other devices in the vicinity. Access point might request corrected information from the mobile devices if a portion or subset of the information (power target, power offset or other information) included in the broadcast signal is determined to be incorrect by a mobile device. In accordance with some aspects, the broadcast signal includes a request that one or more mobile devices confirm if the information included in the broadcast signal is correct or if it is incorrect.

At 504, corrected information is received in a reply signal from one or more mobile devices. The corrected information can include one or more modifications to the information that was sent in the broadcast signal. For example, one or more mobile devices can determine what information in the broadcast signal should be modified in order for subsequent mobile devices to receive the correct information in an initial communication (e.g., signal) from the access point. The corrected information can include offset information or other information that might mitigate the amount of time devices need to establish communication with access point. In accordance with some aspects, if there are no corrections needed to the broadcast signal, a reply signal is not received at 504. In accordance with other aspects, a reply signal is received, at 504, indicating that the broadcast signal information is, correct.

The modified information received from the one or more mobile devices can be selectively applied by access point, at 506, to correct the information included in the broadcast signal. For example, access point might selectively adjust its broadcast information if access point determines that the information is reliable. The information might not be deemed reliable unless a confidence level is reached. The confidence level can be derived, in part, on the reliability of the mobile device based on historical information or based on other criteria. Until the information is deemed reliable, the modification might not be applied to the broadcast signal.

However, if the information is determined to be unreliable or not corroborated by other devices, access point might not adjust the broadcast information. In some situations, access point might request further information from the same mobile device or from other mobile devices that can hear the broadcast signal. For example, access point can request corroboration of the at least one modification from a second (or more mobile devices) before updating the broadcast signal.

Access point may make modifications to the information received from one or more mobile devices before applying such modifications to the information included in the broadcast signal. For example, the measurements (or other information) received from more than one device might be averaged if the measurements do not match and/or are similar. Other criteria can also be utilized to selectively modify information (e.g., the identification of the mobile device supplying the modification information, the reliability of the mobile device based on historical information, and so forth). The method 500 can continue, at 502, when modified (or the same) information is broadcast. As such, the information included in the broadcast signal can be continuously modified, as needed, when changes within the communications network occur that render at least a subset of the broadcast signal information not correct. In accordance with some aspects; feedback information (e.g., notification whether the broadcast information is correct or incorrect) can be requested and/or received from at least one mobile device periodically or continuously to verify that the broadcast information remains as correct as possible.

With reference to FIG. 6, illustrated is a methodology 600 that facilitates automatic correction of broadcast information through a feedback mechanism. Method 600 starts, at 602 when broadcast information is received. This information can be received at (or actively sought out) when a device enters the geographic area of a base station (e.g., is handed off, upon power-up and so forth). The broadcast information can include various types of information including, but not limited to, an identification of an access point, an access point transmit power level, an access point receive power target level, an offset value, as well as other information that can be utilized by a mobile device to identify and use access point.

The information included in the broadcast signal might be correct or there might be one or more portions of the information in the broadcast signal that are inaccurate. If the information is correct, the mobile device can quickly establish communication with access point. The mobile device may send a confirmation to access point indicating that the information is correct, however, this is not necessary.

If the information or a subset of the information in the broadcast-signal is incorrect, a determination is made as to which information is incorrect, at 604. Such a determination can be made based on using the information to establish a communication and, if the communication is not established within a predetermined interval, modifying the information (e.g., adjusting a transmit power level) until communication is established. For example, an access point transmit power and a device receiver power can be compared to determine the difference between the two powers. The access point transmit power can be known from information included in the broadcast signal. The difference between the two powers can be referred to as a power loss or power offset value. Additionally or alternatively, calculations can be performed to correct the information or other actions can be taken to determine if any of the information is incorrect and to ascertain necessary corrections. In accordance with some aspects the broadcast signal can include a request for the mobile device to verify whether a subset (or all) information included in the broadcast signal is accurate and/or needs changes.

At 606, a message including recommended changes can be conveyed (e.g., in a feedback-signal) to the device that sent the broadcast information, such as an access point. For example, the power offset information can be provided to the access point recommending that the power offset information be included in a subsequent broadcast signal. The device that sent the broadcast information can selectively modify the broadcast information and convey the modified broadcast information until another change is recommended, which can be selectively applied. As such, if changes are determined to be needed in the broadcast information, these changes can be made so that devices that receive the broadcast information at a later time receive corrected or modified information deemed to be correct. In accordance with some aspects, the access point can be notified if the information included in the broadcast signal does not need modification (e.g., is correct), however such notification is not necessary.

It will be appreciated that, in accordance with one or more aspects described herein, inferences can be made regarding dynamically updating broadcast information. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selectively making changes to information included in a broadcast signal. In accordance with another example, an inference can be made related to a number of verifications that should be received based on a type of information that is recommended to be changed. According to a further example, an inference can be made pertaining to a likelihood of a recommended change being accurate based upon an identification of a device that provided the recommendation. It will be appreciated that the foregoing examples are illustrative in nature and are not intended to limit the number of inferences that can be made or the manner in which such inferences are made in conjunction with the various aspects described herein.

Figure 7:
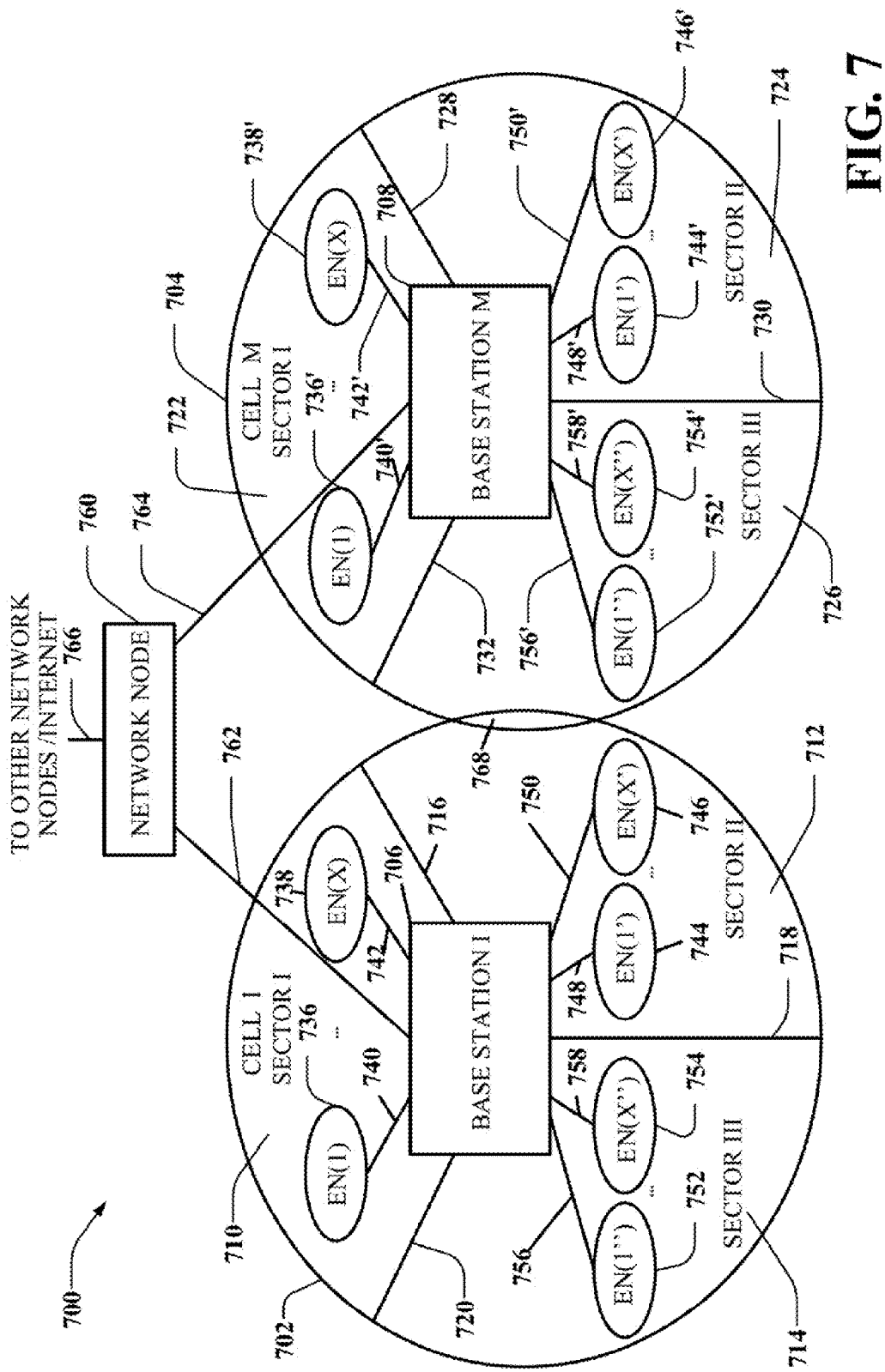
FIG. 7 illustrates an example communication system implemented in accordance with various aspects including multiple cells.

FIG. 7 depicts an example communication system 700 implemented in accordance with various aspects including multiple cells: cell I 702, cell M 704. Note that neighboring cells 702, 704 overlap slightly, as indicated by cell boundary region 768, thereby creating potential for signal interference between signals transmitted by base stations in neighboring cells. Each cell 702, 704 of system 700 includes three sectors. Cells which have not be subdivided into multiple sectors (N=1), cells with two sectors (N=2) and cells with more than 3 sectors (N>3) are also possible in accordance with various aspects. Cell 702 includes a first sector, sector I 710, a second sector, sector II 712, and a third sector, sector III 714. Each sector 710, 712, 714 has two sector boundary regions; each boundary region is shared between two adjacent sectors.

Sector boundary regions provide potential for signal interference between signals transmitted by base stations in neighboring sectors. Line 716 represents a sector boundary region between sector I 710 and sector II 712; line 718 represents a sector boundary region between sector II 712 and sector III 714; line 720 represents a sector boundary region between sector III 714 and sector I 710. Similarly, cell M 704 includes a first sector, sector I 722, a second sector, sector II 724, and a third sector, sector III 726. Line 728 represents a sector boundary region between sector I 722 and sector II 724; line 730 represents a sector boundary region between sector II 724 and sector III 726; line 732 represents a boundary region between sector III 726 and sector I 722. Cell I 702 includes a base station (BS), base station I 706, and a plurality of end nodes (ENs) (e.g., wireless terminals) in each sector 710, 712, 714. Sector I 710 includes EN(1) 736 and EN(X) 738 coupled to BS 706 by wireless links 740, 742, respectively; sector II 712 includes EN(1') 744 and EN(X') 746 coupled to BS 706 by wireless links 748, 750, respectively; sector III 714 includes EN(1") 752 and EN(X") 754 coupled to BS 706 by wireless links 756, 758, respectively. Similarly, cell M 704 includes base station M 708, and a plurality of end nodes (ENs) in each sector 722, 724, 726. Sector I 722 includes EN(1) 736' and EN(X) 738' coupled to BS M 708 by wireless links 740', 742', respectively; sector II 724 includes EN(1') 744' and EN(X') 746' coupled to BS M 708 through wireless links 748', 750', respectively; sector 3 726 includes EN(1") 752' and EN(X") 754' coupled to BS 708 by wireless links 756', 758', respectively.

System 700 also includes a network node 760 which is coupled to BS I 706 and BS M 708 by network links 762, 764, respectively. Network node 760 is also coupled to other network nodes, (e.g., other base stations, AAA server nodes, intermediate nodes, routers, and so forth) and the Internet through network link 766. Network links 762, 764, 766 may be, example, fiber optic cables. Each end node, such as EN(1) 736, may be a wireless terminal including a transmitter as well as a receiver. The wireless terminals, (e.g., EN(1) 736) may move through system 700 and may communicate through wireless links with the base station in the cell in which the EN is currently-located. The wireless terminals, (WTs) (e.g., EN(1) 736), may communicate with peer nodes, (e.g., other WTs in system 700 or outside system 700) through a base station, such as BS 706, and/or network node 760. WTs, such as EN(1) 736 may be mobile communications devices such as cell phones, personal data assistants with wireless modems, etc.

Respective base stations perform tone subset allocation using a different method for the strip-symbol periods, from the method employed for allocating tones and determining tone hopping in the rest symbol periods (e.g., non strip-symbol periods). The wireless terminals use the tone subset allocation method along with information received from the base station (e.g., base station slope ID, sector ID information) to determine tones that they can employ to receive data and information at specific strip-symbol periods. The tone subset allocation sequence is constructed, in accordance with various aspects to spread inter-sector and inter-cell interference across respective tones.

Figure 8:
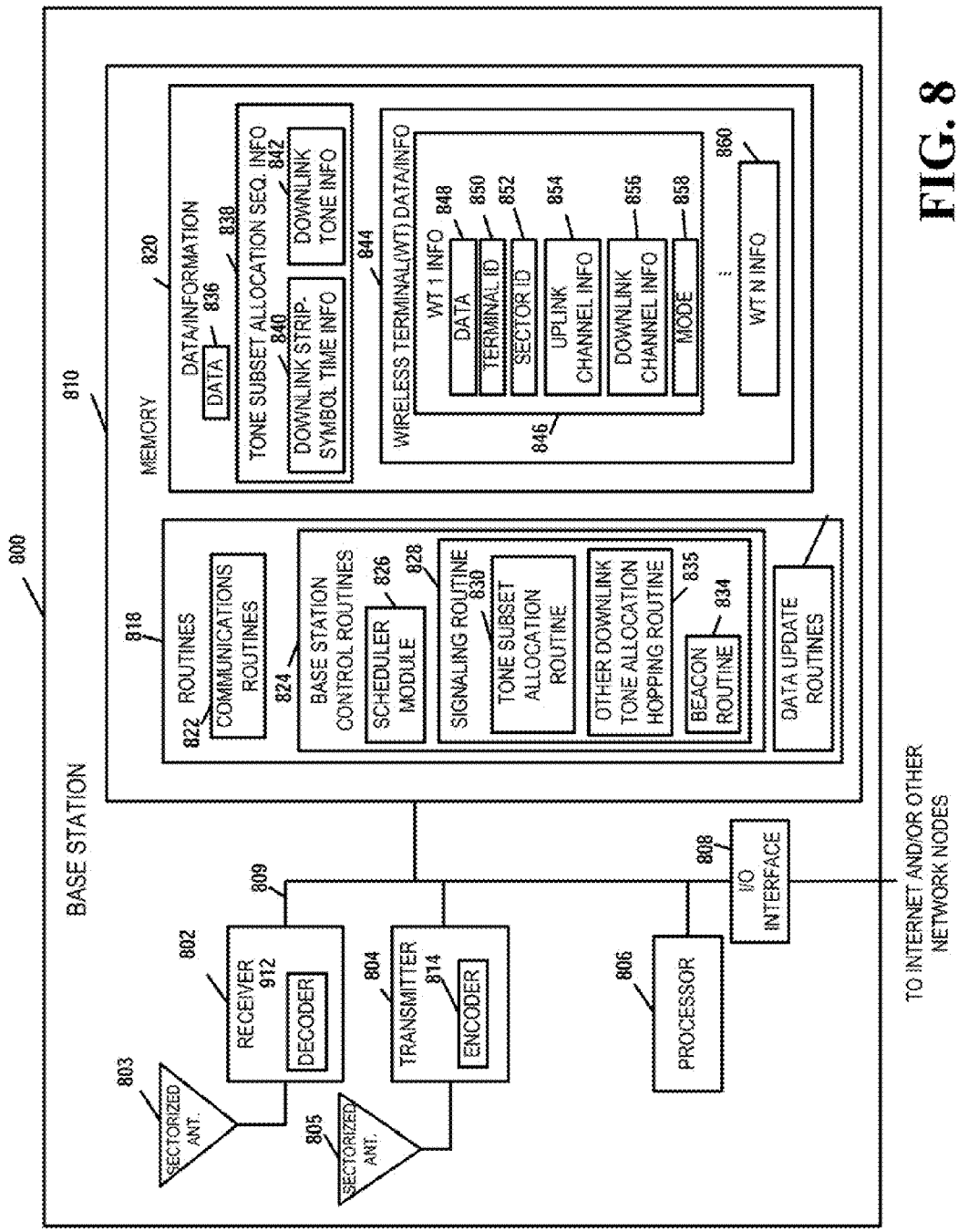
FIG. 8 illustrates an example base station in accordance with various aspects.

FIG. 8 illustrates an example base station 800 in accordance with various aspects. Base station 800 implements tone subset allocation sequences, with different tone subset allocation sequences-generated for respective different sector types of the cell. Base station 800 may be used as any one of base stations 706, 708 of the system 700 of FIG. 7. The base station 800 includes a receiver 802, a transmitter 804, a processor 806 (e.g., CPU), an input/output interface 808 and memory 810 coupled together by a bus 809 over which various elements 802, 804, 806, 808, and 810 may interchange data and information.

Sectorized antenna 803 coupled to receiver 802 is used for receiving data and other signals, e.g., channel reports, from wireless terminals transmissions from each sector within the base station's cell. Sectorized antenna 805 coupled to transmitter 804 is used for transmitting data and other signals (e.g., control signals, pilot signal, beacon signals, and so forth) to wireless terminals 900 (see FIG. 9) within each sector of the base station's cell. In various aspects, base station 800 may employ multiple receivers 802 and multiple transmitters 804, for example, an individual receiver 802 for each sector and an individual transmitter 804 for each sector. Processor 806 may be; for example, a general purpose central processing unit (CPU). Processor 806 controls operation of base station 800 under direction of one or more routines 818 stored in memory 810 and implements the methods. Input/Output (I/O) interface 808 provides a connection to other network nodes, coupling the BS 800 to other base stations, access routers, AAA server nodes, etc., other networks, and the Internet. Memory 810 includes routines 818 and data/information 820.

Data/information 820 includes data 836, tone subset allocation sequence information 838 including downlink strip-symbol time information 840 and downlink tone information 842, and wireless terminal (WT) data/info 844 including a plurality of sets of WT information: WT 1 info 846 and WT N info 860. Each set of WT info (e.g., WT 1 info 846) includes data 848, terminal ID 850, sector ID 852, uplink channel information 854, downlink channel information 856, and mode information 858.

Routines 818 include communications routines 822, base station control routines 824, and data update routines 862. Base station control routines 824 includes a scheduler module 826 and signaling routines 828 including a tone subset allocation routine 830 for strip-symbol periods, other downlink tone allocation hopping routine 832 for the rest of symbol periods (e.g., non strip-symbol periods), and a beacon routine 834. Data update routines 862 can further include feedback evaluation routines (not shown) and/or device characteristic evaluation routines (not shown).

Data 836 includes data to be transmitted that will be sent to encoder 814 of transmitter 804 for encoding prior to transmission to WTs, and received data from WTs that has been processed through decoder 812 of receiver 802 following reception. Downlink strip-symbol time information 840 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 842 includes information including a carrier frequency assigned to the base station 800, the number and frequency of tones, and the set of tone subsets to be allocated to, the strip-symbol periods, and other cell and sector specific values such as slope, slope index and sector type.

Data 848 may include data that WT1 900 has received from a peer node, data that WT 1 900 desires to be transmitted to a peer node, and downlink channel quality report feedback information. Terminal ID 850 is a base station 800 assigned ID that identifies WT 1 900. Sector ID 852 includes information identifying the sector in which WT 900 is operating. Sector ID 852 can be used, for example, to determine the sector type. Uplink channel information 854 includes information identifying channel segments that have been allocated by scheduler 826 for WT1 900 to use (e.g., uplink traffic channel segments for data, dedicated uplink control channels for requests, power control, timing control, and so forth).

Each uplink channel assigned to WT1 900 includes one or more logical tones, each logical tone following an uplink hopping sequence. Downlink channel information 856 includes information identifying channel segments that have been allocated by scheduler 826 to carry data and/or information to WT1 900 (e.g., downlink traffic channel segments for user data). Each downlink channel assigned to WT1 900 includes one or more logical tones, each following a downlink hopping sequence. Mode information 858 includes information identifying the state of operation of WT1 900 (e.g., sleep, hold, on).

Communications routines 822 control the base station 800 to perform various communications operations and implement various communications protocols. Base station control routines 824 are used to control the base station 800 to perform basic base station functional tasks (e.g., signal generation and reception, scheduling) and to implement the steps of the method of some aspects including transmitting signals to wireless terminals using the tone subset allocation sequences during the strip-symbol periods.

Signaling routine 828 controls the operation of receiver 802 with its decoder 812 and transmitter 804 with its encoder 814. The signaling routine 828 is responsible for controlling the generation of transmitted data 836 and control information. Tone subset allocation routine 830 constructs the tone subset to be used in a strip-symbol period using the method of the aspect and using data/information 820 including downlink strip-symbol time info 840 and sector ID 852. The downlink tone subset allocation sequences will be different for each sector type in a cell and different for adjacent cells. The WTs 900 receive the signals in the strip-symbol periods in accordance with the downlink tone subset allocation sequences; the base station 800 uses the same downlink tone subset allocation sequences in order to generate the transmitted signals. Other downlink tone allocation hopping routine 832 constructs downlink tone hopping sequences, using information including downlink tone information 842, and downlink channel information 856, for the symbol periods other than the strip-symbol periods. The downlink data tone hopping sequences are synchronized across the sectors of a cell. Beacon routine 834 controls the transmission of a beacon signal (e.g., a signal of relatively high power signal concentrated on one or a few tones), which may be used for synchronization purposes (e.g., to synchronize the frame timing structure of the downlink signal) and therefore the tone subset allocation sequence with respect to an ultra-slot boundary.

Data update routines 862 can further include feedback evaluation routines (not shown) and/or device characteristic evaluation routines (not shown). Feedback can be evaluated to determine if data included in a transmitted signal should be updated, deleted, added and so forth. The feedback can be from one or more devices and can relate to all or a sub-portion of data transmitted by base station 800. Additionally and/or alternatively, characteristics associated with a device that provided the feedback can be evaluated to determine if the data should be modified. Moreover, data update routines 862 can control data modification based on a confidence level associated with the modified data and/or the device that supplied the modification. In accordance with some aspects, the data update routines 862 can be based on an aggregate of feedback received and/or based on other criteria.

Figure 9:
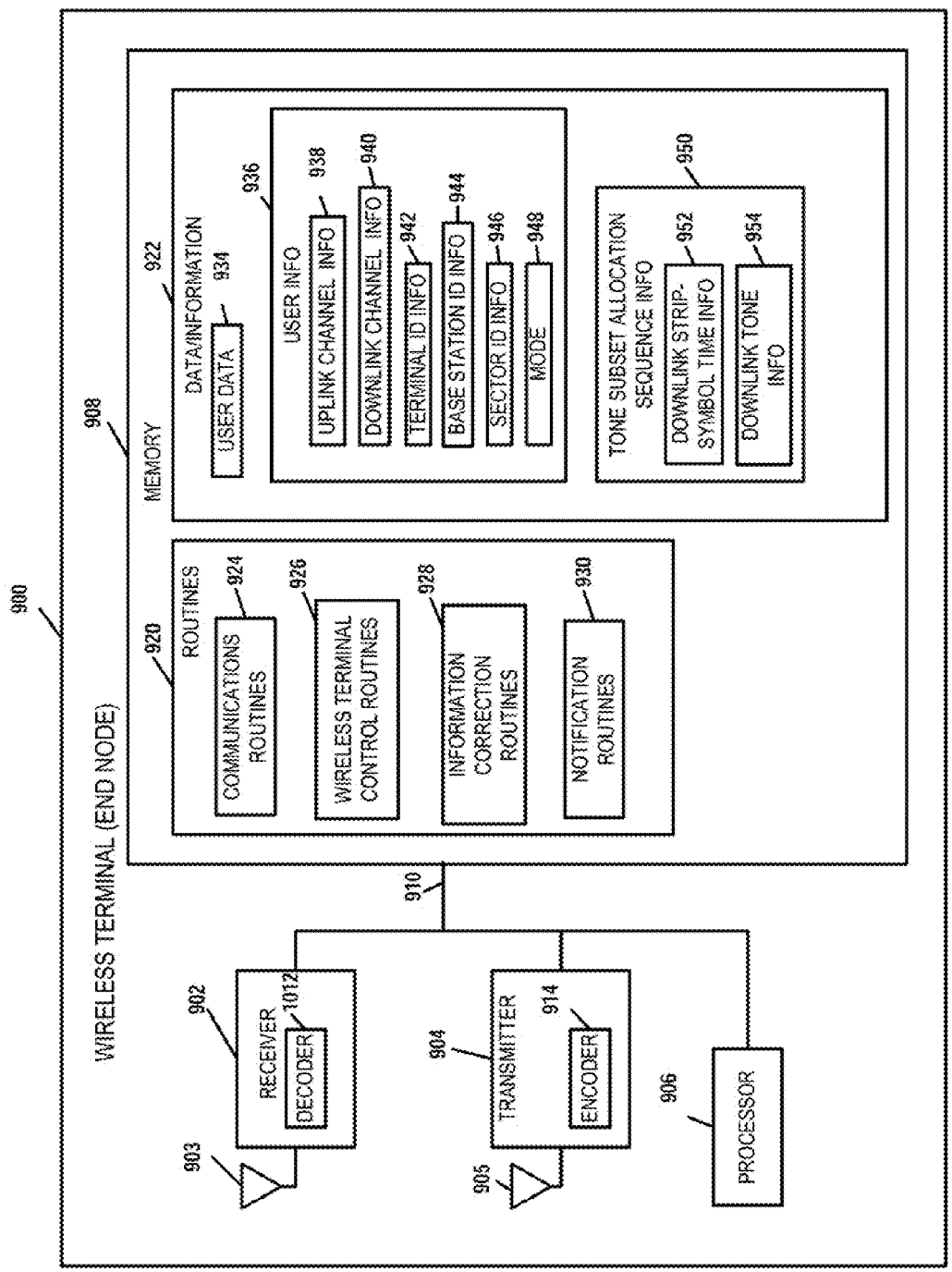
FIG. 9 illustrates an example wireless terminal (e.g., mobile device, end node, and so forth) implemented in accordance with various aspects described herein.

FIG. 9 illustrates an example wireless terminal (e.g., end node, mobile device, . . . ) 900 that can be used as any one of the wireless terminals (e.g., end nodes, mobile devices, . . . ), e.g., EN(1) 736, of the system 700 shown in FIG. 7. Wireless terminal 900 implements the tone subset allocation sequences. Wireless terminal 900 includes a receiver 902 including a decoder 912, a transmitter 904 including an encoder 914, a processor 906, and memory 908 which are coupled together by a bus 910 over which the various elements 902, 904, 906, 908 can interchange data and information. An antenna 903 used for receiving signals from a base station 800 (and/or a disparate wireless terminal) is coupled to receiver 902. An antenna 905 used for transmitting signals, such as to base station 800 (and/or a disparate wireless terminal) is coupled to transmitter 904.

The processor 906 (e.g., a CPU) controls operation of wireless terminal 900 and implements methods by executing routines 920 and using data/information 922 in memory 908. Data/information 922 includes user data 934, user information 936, and tone subset allocation sequence information 950. User data 934 may include data, intended for a peer node, which will be routed to encoder 914 for encoding prior to transmission by transmitter 904 to base station 800, and data received from the base station 800 which has been processed by the decoder 912 in receiver 902. User information 936 includes uplink channel information 938, downlink channel information 940, terminal ID information 942, base station ID information 944, sector ID information 946, and mode information 948.

Uplink channel information 938 includes information identifying uplink channels segments that have been assigned by base station 800 for wireless terminal 900 to use when transmitting to the base station 800. Uplink channels may include uplink traffic channels, dedicated uplink control channels (e.g., request channels, power control channels and timing control channels). Each uplink channel includes one or more logic tones, each logical tone following an uplink tone hopping sequence. The uplink hopping sequences are different between each sector type of a cell and between adjacent cells. Downlink channel information 940 includes information identifying downlink channel segments that have been assigned by base station 800 to WT 900 for use when BS 800 is transmitting data/information to WT 900. Downlink channels may include downlink traffic channels and assignment channels, each downlink channel including one or more logical tone, each logical tone following a downlink hopping sequence, which is synchronized between each sector of the cell.

User info 936 also includes terminal ID information 942, which is a base station 800 assigned identification, base station ID information 944 that identifies the specific base station 800 that WT has established communications with, and sector ID info 946, which identifies the specific sector of the cell where WT 900 is presently located. Base station ID 944 provides a cell slope value and sector ID info 946 provides a sector index type; the cell slope value and sector index type may be used to derive tone hopping sequences. Mode information 948 also included in user info 936 identifies whether the WT 900 is in sleep mode, hold mode, or on mode.

Tone subset allocation sequence information 950 includes downlink strip-symbol time information 952 and downlink tone information 954. Downlink strip-symbol time information 952 include the frame synchronization structure information such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base-station. Downlink tone info 954 includes information including a carrier frequency assigned to the base station 800, the number and frequency of tones, and the set of tone subsets to be allocated to the strip-symbol periods, and other cell and sector specific values such as slope, slope index and sector type.

Routines 920 include communications routines 924, wireless terminal control routines 926, information correction routines 928 and notification routines 930. Communications routines 924 control the various communications protocols used by WT 900. By way of example, communications routines 924 may enable receiving a broadcast signal (e.g., from base station 800). Wireless terminal control routines 926 control basic wireless terminal 900 functionality including the control of the receiver 902 and transmitter 904.

Information correction routines 928 can control selective correction of information included in a signal received from an access point. The selective correction can relate to information utilized by wireless terminal 900 to identify and establish communication with access point. For example, the correction can relate to a power offset or other information that should be included in the signal or that should be modified. Notification routines 930 can control notification of the corrections and/or verification of the correctness of information included in the signal.

Figure 10:
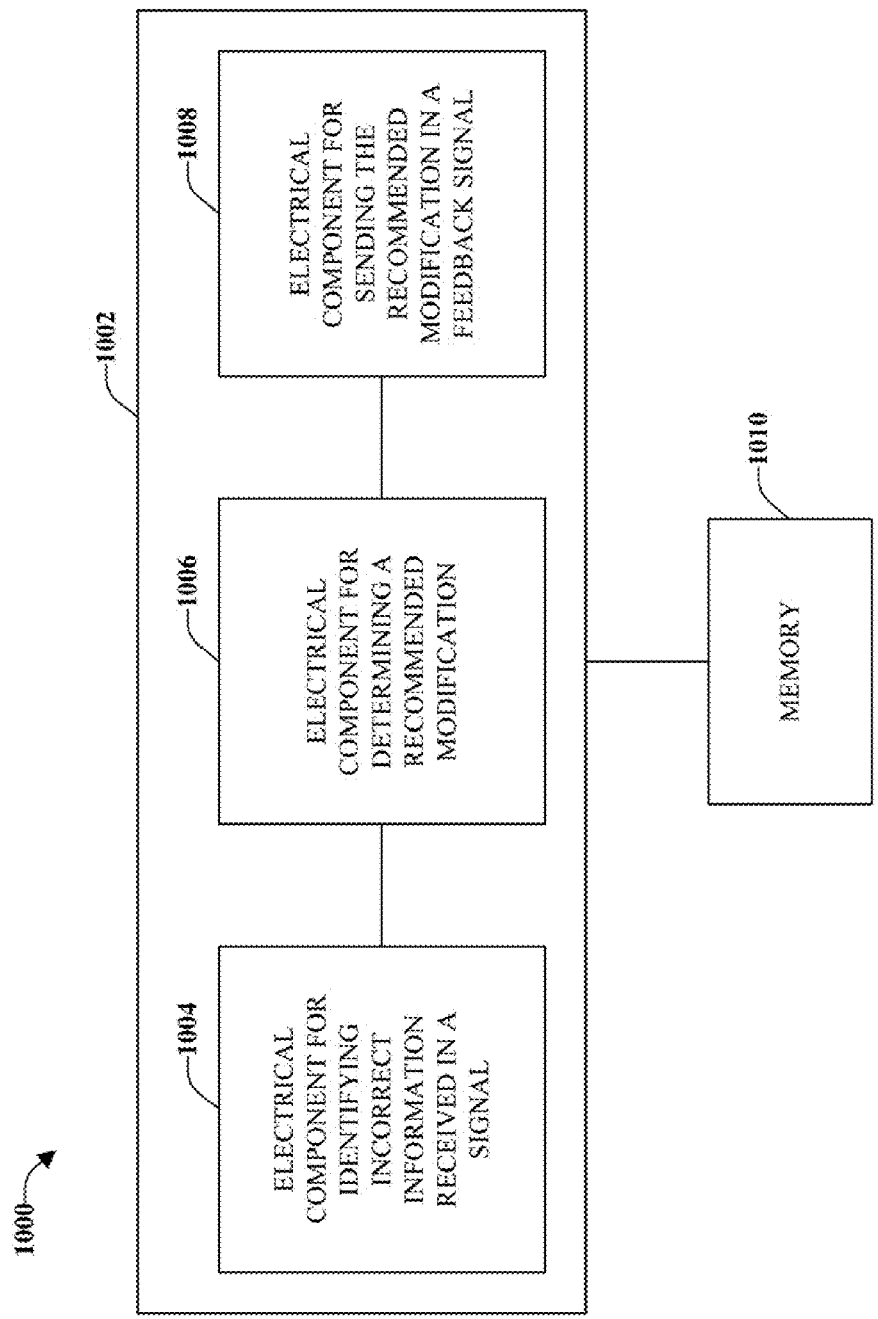
FIG. 10, illustrates an example system that enables selective modification of broadcast information within a wireless communications environment.

With reference to FIG. 10, illustrated is an example system 1000 that enables selective modification of broadcast information within a wireless communications environment. For example, system 1000 may reside at least partially within a mobile device. It is to be appreciated that system 1000 is represented as including functional blocks, which may be functional blocks that represent functions implemented by a processor, software, or combination thereof (e.g., firmware). System 1000 includes a logical grouping 1002 of electrical components that can act individually and/or in conjunction.

Logical grouping 1002 may include an electrical component for identifying incorrect information received in a signal 1104. The signal can be received from an access point and can include a variety of information including but not limited to an access point power target, an access point transmit power, a power offset, and so forth. Also, including in the signal can be a request to verify at least a portion of the information included in the signal.

Further, logical grouping 1002 can comprise an electrical component for determining a recommended modification 1106. The recommended modification can be a modification relating to information in the signal that should be changed, added, deleted, etc. For example, a logical module can determine a power offset value. The power offset value can be based in part on information included in the signal, such as an access point transmit power. The access point transmit power can be compared to a receive power and the difference between the two powers determined, which can be referred to as the power offset value.

Logical grouping 1002 can include an electrical component for sending the recommended modification in a feedback signal 1108. The recommended modification can be a power offset value that should be included (or updated) in the signal. By way of illustration, the feedback signal can be sent to access point, wherein access point can use the information to selectively modify information in the signal. In accordance with some aspects, a result of the verification (if one was requested) can be conveyed to the access point. A next signal can be received from an access point and evaluated. The result of whether the next signal is correct or incorrect can be sent in a feedback notification to the access point.

Additionally, system 1000 may include a memory 1010 that retains instructions for executing functions associated with electrical components 1004, 1006, and 1008. While shown as being external to memory 1010, it is to be understood that one or more of electrical components 1004, 1006, and 1008 may exist within memory 1010.

Figure 11:
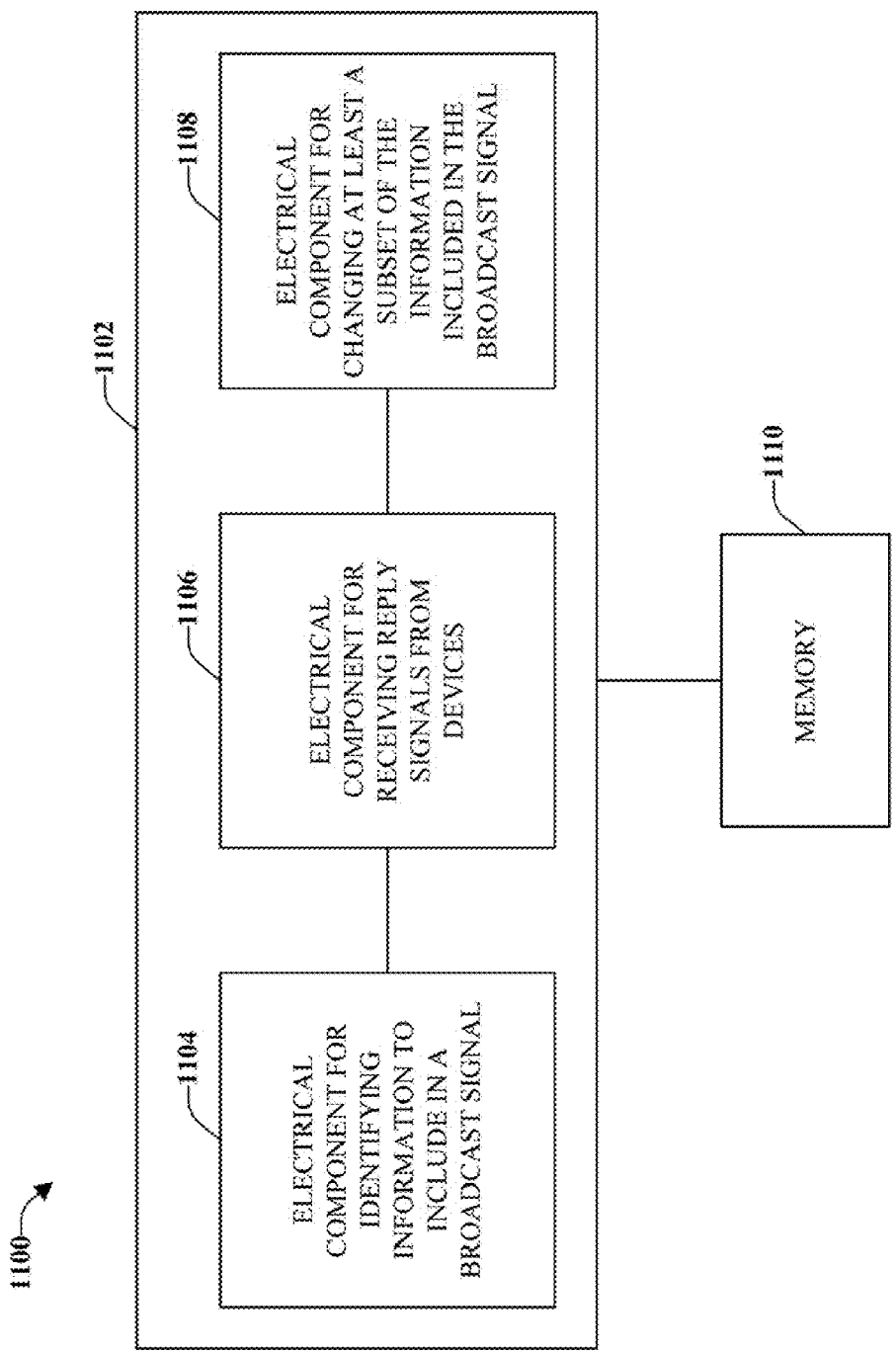
FIG. 11 illustrates an example system that can mitigate a length of an initial access phase in a wireless environment.

With reference to FIG. 11, illustrated is a system 1100 that can mitigate a length of an initial access phase in a wireless environment. For example, system 1100 may reside at least partially within a base station. It is to be appreciated that system 1100 is represented as including functional blocks, which may be functional blocks that represent functions implemented by a processor, software, or combination thereof (e.g., firmware). System 1000 includes a logical grouping 1102 of electrical components that can act independently and/or in conjunction. For instance, logical grouping 1102 may include an electrical component for identifying information to include in a broadcast signal 1104. The broadcast information can be sent to multiple devices and can include a variety of information relating to system 1100 and can include information that various devices can receive and rely upon to identify and gain access (e.g., initial access phase) to system 1100. Broadcast information can also include requests for the one or more of the devices to respond and/or verify the accuracy of the information included in the broadcast signal.

Further, logical grouping 1102 can comprise an electrical component for receiving reply signals from one or more of the devices 1106. The reply signal can be in response to the broadcast signal. For example, one or more of the various devices can automatically provide updated information and/or a recommendation to modify-one or more portions of information in the broadcast signal if the device determines that the information is incorrect. In accordance with some aspects, if the information is correct, one or more devices can reply indicating that the information is accurate. Additionally and/or alternatively, one or more devices might only provide a recommendation or other feedback if there is a request for such information included in the broadcast signal.

Moreover, logical grouping 1102 can include an electrical component for changing at least a subset of the information included in the broadcast signal 108. The change can be based on the one or more reply signals or can be based on other criteria. By way of illustration, changing at least a subset of the information can be optimized by considering various characteristics of one or more received reply signals and/or the characteristics of the devices supplying the recommendations. For example, if more than one reply signal is received an average or aggregate of the signals can be utilized to change the information. A confidence level of accuracy of the information (e.g., reply signal) supplied by one or more devices can be analyzed to determine if information within the broadcast signal should be changed. The information changed can relate to power or other information wherein corrected information can mitigate the amount of time that a subsequent device takes to identify and gain access to system 1100. A request can be sent in a subsequent broadcast signal for devices within the vicinity to verify the accuracy of the modified information.

It is to be understood that the aspects described herein may be implemented in hardware software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method of operating a wireless device, comprising:
    receiving a broadcast signal from an access point, the broadcast signal including transmission power control information;
    measuring a received pilot power level;
    determining a transmission power to be used for an access request signal based on the received transmission power control information and the measured received pilot power level; and
    determining if the broadcast signal includes inaccurate transmission power control information.

2. The method of claim 1, wherein said broadcast signal provides power offset information.

3. The method of claim 1, further comprising:
    performing an initial access attempt using said determined transmission power.

4. The method of claim 3, further comprising:
    performing an additional access attempt using a higher transmission power when said initial access attempt using said determined transmission power level is unsuccessful.

5. The method of claim 1, further comprising:
    conveying a recommended change to the transmission power control information when it is determined that transmission power control information included in the broadcast signal includes inaccurate transmission power control information.

6. The method of claim 5, wherein said transmission power control information includes open loop transmission power control information including a power offset; and
    wherein said recommended change includes a recommended change to said power offset.

7. The method of claim 1, wherein said determining a transmission power to be used for an access request signal includes determining if a transmission power offset included in the received transmission power control information is inaccurate.

8. A wireless device comprising:
    means for receiving a broadcast signal from an access point, the broadcast signal including transmission power control information;
    means for measuring a received pilot power level;
    means for determining a transmission power to be used for an access request signal based on the received transmission power control information and the measured received pilot power level; and
    means for determining if the broadcast signal includes inaccurate transmission power control information.

9. The wireless device of claim 8, wherein said broadcast signal provides power offset information.

10. The wireless device of claim 9, further comprising:
    means for conveying a recommended change to the transmission power control information it is determined that transmission power control information included in the broadcast signal includes inaccurate transmission power control information.

11. The wireless device of claim 10, wherein said transmission power control information includes open loop transmission power control information including a power offset; and
    wherein said recommended change includes a recommended change to said power offset.

12. The wireless device of claim 8, further comprising:
    means for performing an initial access attempt using said determined transmission power.

13. The wireless device of claim 12, wherein said means for performing an initial access attempt perform an additional access attempt using a higher transmission power when said initial access attempt using said determined transmission power level is unsuccessful.

14. A wireless device comprising:
at least one processor configured to:
receive a broadcast signal from an access point, the broadcast signal including transmission power control information;
measuring a received pilot power level;
determine a transmission power to be used for an access request signal based on the received transmission power control information and the measured received pilot power level ; and
determine if the broadcast signal includes inaccurate transmission power control information; and
a memory coupled to said at least one processor.

15. The wireless device of claim 14, wherein said broadcast signal provides power offset information.

16. The wireless device of claim 14, wherein said at least one processor is further configured to perform an initial access attempt using said determined transmission power.

17. The wireless device of claim 16, wherein said at least one processor is further configured to perform an additional access attempt using a higher transmission power when said initial access attempt using said determined transmission power level is unsuccessful.

18. The wireless device of claim 14, wherein said at least one processor is further configured to convey a recommended change to the transmission power control information when it is determined that transmission power control information included in the broadcast signal includes inaccurate transmission power control information.

19. The wireless device of claim 18, wherein said transmission power control information includes open loop transmission power control information including a power offset; and
wherein said recommended change includes a recommended change to said power offset.

20. A computer program product for use in a wireless device, comprising:
non-transitory computer readable medium comprising:
code for causing at least one computer to receive a broadcast signal from an access point, the broadcast signal including transmission power control information;
code for causing the at least one computer to measure a received pilot power level;
code for causing the at least one computer to determine a transmission power to be used for an access request signal based on the received transmission power control information and the measured received pilot power level; and
code for causing the at least one computer to determine if the broadcast signal includes inaccurate transmission power control information.

\* \* \* \* \*